United States Patent [19]

Story

[11] Patent Number: 5,651,864
[45] Date of Patent: Jul. 29, 1997

[54] METHOD FOR PARTICLE SYNTHESIS AND RECOVERY

[75] Inventor: Phillip M. Story, Yukon, Okla.

[73] Assignee: Kerr-McGee Corporation, Oklahoma City, Okla.

[21] Appl. No.: 607,824

[22] Filed: Feb. 27, 1996

[51] Int. Cl.[6] .................................................. C01G 23/07
[52] U.S. Cl. ............................................. 204/164; 423/613
[58] Field of Search ............................. 204/164; 75/343, 75/346, 10.67; 423/613

[56] References Cited

U.S. PATENT DOCUMENTS

| | | | |
|---|---|---|---|
| 3,419,351 | 12/1968 | Zirngibl et la. | 423/336 |
| 3,434,950 | 3/1969 | Weinberg et al. | 204/164 |
| 3,501,262 | 3/1970 | Arkless et al. | 423/613 |
| 4,279,345 | 7/1981 | Allred | 209/3.2 |
| 4,643,744 | 2/1987 | Brooks | 55/107 |
| 4,728,694 | 3/1988 | Batich et al. | 525/246 |
| 5,201,949 | 4/1993 | Allen et al. | 106/436 |

FOREIGN PATENT DOCUMENTS 0 212 379A2   7/1986   European Pat. Off. .

OTHER PUBLICATIONS

Simco 1992–1993 Product Catalog, The Simco Company, Inc., Hatfield, PA USA.

*Primary Examiner*—John Niebling
*Assistant Examiner*—Brendan Mee
*Attorney, Agent, or Firm*—Florence Fusco McCann

[57] ABSTRACT

A method for synthesizing a particulate product including electrostatically charging a fuel and/or oxidizer and/or ionizable inert gas present during the synthesis is provided. The method can include a step of collecting the particulate product which exploits the charged nature of the particulate reaction product.

28 Claims, No Drawings

METHOD FOR PARTICLE SYNTHESIS AND RECOVERY

BACKGROUND OF THE INVENTION

1. Field of the Invention

The invention relates to synthesis of a particulate product and, more particularly, to ionization assisted particulate product synthesis.

2. Description of the Prior Art

Combustion synthesis processes are widely used for commercial production of fine powders including powders of materials such as titanium dioxide, silica and carbon black. In order to maintain the flow properties of the particulate reaction product during the synthesis process and avoid accumulation of product within the reactor as well as to control the degree of agglomeration of the particulate reaction product, ionic salt additives such as KCl or NaCl are introduced into the reactant gas stream for process control. While the use of such ionic salt additives does provide satisfactory control of the process parameters described above, it does result in the introduction of an impurity, the ionic salt additive, into the particulate reaction product.

Thus, there exists a need for a method for control of particulate reaction product flow and accumulation, and degree of particulate reaction product agglomeration without introduction of impurities into the particulate product. Such a method should also improve efficiency of recovery of the particulate reaction product.

SUMMARY OF THE INVENTION

The invention provides a method which controls reaction product flow and accumulation and degree of particulate reaction product agglomeration by electrostatically charging the reactant gas stream of the combustion process, thereby avoiding the introduction of an impurity into the particulate reaction product.

One aspect of the invention provides a method for producing a powder including the steps of providing a fuel gas; imparting an electrostatic charge to the fuel gas and allowing the fuel gas to undergo a chemical reaction whereby a particulate reaction product is formed.

Another aspect of the invention provides a method for producing a powder including steps of providing a fuel gas and inert ionizable gas; imparting an electrostatic charge to the inert ionizable gas and allowing the fuel gas to undergo a chemical reaction whereby a particulate reaction product is formed.

According to yet another aspect of the invention, a method for producing a powder including steps of providing a fuel gas and an oxidizer gas; imparting an electrostatic charge to the oxidizer gas and allowing the oxidizer gas to undergo a chemical reaction whereby a particulate reaction product is formed is provided.

An object of this invention is to provide a method for process control of combustion synthesis of a particulate or powder product, directly and without the need for introduction of additives.

Other and further objects, features and advantages of the present invention will be readily apparent to those skilled in the art upon reading the description of preferred embodiments which follows.

DESCRIPTION OF PREFERRED EMBODIMENTS

According to a method of the invention, an electrostatic charge is applied to a fuel gas which is then allowed to undergo chemical reaction, such as combustion, to form a particulate reaction product. The electrostatic charge is applied to the fuel gas before chemical reaction is complete.

Fuel gases such as $TiCl_4$; $SiCl_4$; $AlCl_3$; zinc chloride; metal halide gases, generally; hydrogen; or hydrocarbons or mixtures thereof can be supplied at a reactant gas inlet at a rate sufficient to sustain a chemical reaction given the particular size and dimension characteristics of the burner where the reaction is being conducted.

The method can further include steps of providing a generally stoichiometric quantity or slight excess with respect to the fuel gas of oxidizer gas, such as oxygen, nitrogen, $NO_x$, where x is in the range of from about 1 to about 3 or the like and combining it with the fuel gas. The reaction can be a combustion reaction.

Additionally, an inert ionizable gas such as argon, krypton, xenon, or radon or mixtures thereof can be provided along with the fuel and/or oxidizer gas. As used herein in the specification and claims which follow, an "inert ionizable gas" is a gas which does not participate in the particulate reaction product synthetic reaction and which can readily be ionized by applying a potential difference greater than about $1 \times 10^6$ Volts/m, the breakdown voltage in air. Fine wires can be used as electrodes to limit the line voltage needed to ionize the gas or gases. It is desirable to impart a charge of 70 coul/kg for a 0.01μ particle and a charge of $7 \times 10^{-5}$ coul/kg for a 1μ particle. While higher noble gases, such as radon, are radioactive, if radioactivity is not a concern, they can be used in the method of the invention. Rather than imparting electrostatic charge to the fuel and/or oxidizer gases, the fuel and/or oxidizer gases can be left uncharged and, instead, the inert, ionizable gas can be charged. Alternatively, the inert ionizable gas can be charged as well as the fuel and/or oxidizer gases.

The fuel and/or oxidizer gases, and/or the inert ionizable gas can be electrostatically charged by applying an AC voltage in the range of from about 10,000 volts rms to about 100,000 volts rms at a frequency in the range of from about 1 Hz to about 10,000 Hz or by applying a DC voltage in the range of from about 10,000 volts to about 1,000,000 volts, more preferably in the range of from about 10,000 volts to about 500,000 volts and most preferably in the range of from about 10,000 volts to about 100,000 volts to the gas before the chemical reaction takes place. Appropriate AC and DC voltages will depend on wire size. Equipment for ionizing the gas streams is readily commercially available, as will be appreciated by one skilled in the art. By varying the amount of electrostatic charge imparted to the fuel and/or oxidizer and/or inert gas, the particulate reaction product size distribution can be controlled.

The particulate reaction product retains at least some of the electrostatic charge imparted during the combustion synthesis and can be collected by taking advantage of its behavior as a charged material. The electrostatically charged particulate reaction product can be collected by providing a grounded surface which attracts the charged particles to a single location, thereby facilitating their collection. Alternatively, the charged particulate reaction product can be made to flow in a particulate reaction product stream and combined with a second particulate reaction product stream, oppositely charged, to result in settling of the particulate reaction product. The settled reaction product can then be collected.

AC charging allows the particles to collect upon themselves and, thereby, agglomerate and can be used when particle agglomeration is desirable.

In order further to illustrate the present invention, the following example is provided. The particular compounds, processes and conditions utilized in the example are meant to be illustrative of the present invention and are not limited thereto.

EXAMPLE 1

The following example is provided to show how the particle size distribution of a particulate reaction product, specifically titanium dioxide, can be controlled by charging an inert ionizable gas and how charged particulate reaction product collection efficiency can be improved by providing a grounded collection vessel.

A quantity of $TICl_4$ was vaporized, superheated and mixed with an excess of oxygen in a reactor and ignited in a reaction zone under conditions appropriate to maintain a flame temperature of 1000° C. Simultaneously, a stream of ionized argon gas was introduced into the beginning of the reaction zone at a flow rate of 1% wt/wt.

The argon gas stream was ionized by flowing it through charging electrodes so that a charge of approximately 0.07 coul/kg was imparted to the particles. The voltage on the charging electrodes was varied from 0 volts to 15,000 volts and this variation in charging voltage resulted in a size change in the particulate reaction product, titanium dioxide particles, from 0.25µ to 0.08µ. The particulate reaction product formed was cooled in a water-jacketed cooling tube downstream of the reactor, and collected in a gravity separator including a grounded collection vessel. Product collection was improved from 50% using an ungrounded collection vessel to 90% using the grounded collection vessel.

What is claimed is:

1. A method for producing a powder comprising:
   (1) providing a fuel gas;
   (2) imparting a net electric charge to said fuel gas to produce a charged fuel gas; and
   (3) after step (2) allowing said charged fuel gas to undergo a chemical reaction whereby a particulate reaction product is formed.

2. The method of claim 1 wherein said fuel gas is selected from the group consisting of metal halide gases, hydrogen, and hydrocarbons and mixtures thereof.

3. The method of claim 1 further including steps of:
   (4) providing an oxidizer gas;
   (5) combining said charged fuel gas with said oxidizer gas in a reaction zone so that said charged fuel gas and said oxidizer gas react according to a chemical reaction to form said particulate reaction product.

4. The method of claim 3 wherein said oxidizer gas is selected from the group consisting of oxygen, nitrogen, and $NO_x$ where x is in the range of from about 1 to about 3, and mixtures thereof.

5. The method of claim 3 further comprising a step of imparting a net electric charge to said oxidizer gas to produce a charged oxidizer gas.

6. The method of claim 5 further including steps of providing an inert ionizable gas and imparting a net electric charge to said inert ionizable gas to produce a charged inert ionizable gas.

7. The method of claim 6 wherein said inert ionizable gas is selected from the group consisting of argon, krypton, neon, and radon, and mixtures thereof.

8. The method of claim 3 further including steps of providing an inert ionizable gas and imparting a net electric charge to said inert ionizable gas to produce a charged inert ionizable gas.

9. The method of claim 1 further including steps of providing an inert ionizable gas and imparting a net electric charge to said inert ionizable gas to produce a charged inert ionizable gas.

10. The method of claim 1 wherein said step (2) of imparting a net electric charge to said fuel gas is accomplished by applying an AC voltage to said fuel gas before said chemical reaction of step (3).

11. The method of claim 1 wherein said step (2) of imparting a net electric charge to said fuel gas is accomplished by applying a DC voltage to said fuel gas before said chemical reaction of step (3).

12. The method of claim 1 wherein said net electric charge is about 70 coulomb /kg of fuel gas for an 0.01µ average diameter particulate reaction product particle.

13. The method of claim 1 wherein said net electric charge is about $7 \times 10^{-5}$ coulomb/kg of fuel gas for a 1µ average diameter particulate reaction product particle.

14. The method of claim 1 wherein said particulate reaction product is further characterized by a particulate reaction product size distribution and said particulate reaction product size distribution is controlled by selecting the amount of net electric charge imparted in step (2).

15. The method of claim 1 further comprising a step of collecting said particulate reaction product.

16. The method of claim 15 wherein said particulate reaction product retains at least some of said net electric charge imparted in step (2) and said step of collecting said particulate reaction product further comprises a step of providing a grounded surface where said particulate reaction product is collected.

17. The method of claim 1 wherein said fuel gas is selected from the group consisting of $TiCl_4$, $SiCl_4$, $AlCl_3$, and zinc chloride.

18. A method for producing a powder comprising:
   (1) providing a fuel gas;
   (2) imparting a net electric charge to said fuel gas to produce a charged fuel gas; and
   (3) allowing said charged fuel gas to undergo a chemical reaction whereby a particulate reaction product is formed wherein said particulate reaction product retains at least some of said net electric charge imparted in step (2) and further comprising steps of forming a first particulate reaction product stream characterized by a first retained net electric charge; providing a second particulate reaction product stream characterized by a second net electric charge opposite to said first retained net electric charge; mixing said first particulate reaction product stream with said second particulate reaction product stream to neutralize said first retained net electric charge and said second retained net electric charge and result in settling of said particulate reaction product to form a settled particulate reaction product; and collecting said settled particulate reaction product.

19. A method for producing a powder comprising:
   (1) providing a fuel gas and an oxidizer gas;
   (2) imparting a net electric charge to said oxidizer gas to form a charged oxidizer gas; and (3) after step (2), allowing said fuel gas and said charged oxidizer gas to undergo a chemical reaction whereby a particulate reaction product is formed.

20. The method of claim 19 wherein said fuel gas is selected from the group consisting of metal halide gases, hydrogen, and hydrocarbons and mixtures thereof.

21. The method of claim 19 wherein said oxidizer gas is selected from the group consisting of oxygen, nitrogen, and $NO_x$ where x is in the range of from about 1 to about 3, and mixtures thereof.

22. The method of claim 19 further including steps of providing an inert ionizable gas and imparting a net electric charge to said inert ionizable gas to produce a charged inert ionizable gas.

23. The method of claim 19 wherein said fuel gas is selected from the group consisting of $TiCl_4$, $SiCl_4$, $AlCl_3$, and zinc chloride.

24. A method for producing a powder comprising:

(1) providing a fuel gas and an oxidizer gas;

(2) providing an inert ionizable gas;

(3) imparting a net electric charge to said inert ionizable gas; and (4) after step (3), allowing said fuel gas and said oxidizer gas to undergo a chemical reaction whereby a particulate reaction product is formed.

25. The method of claim 24 wherein said fuel gas is selected from the group consisting of metal halide gases, hydrogen and hydrocarbons and mixtures thereof.

26. The method of claim 24 wherein said inert ionizable gas is selected from the group consisting of argon, krypton, xenon, and radon, and mixtures thereof.

27. The method of claim 24 wherein said oxidizer gas is selected from the group consisting of oxygen, nitrogen, and $NO_x$ where x is in the range of from about 1 to about 3, and mixtures thereof.

28. The method of claim 24 wherein said fuel gas is selected from the group consisting of $TiCl_4$, $SiCl_4$, $AlCl_3$, and zinc chloride.

* * * * *